May 13, 1947.  A. G. EVANS  2,420,530
COMBINED IMPLEMENT STABILIZING AND LIFTING STRUCTURE
Filed Dec. 13, 1943  3 Sheets-Sheet 1

Inventor:
Arthur G. Evans.
By Paul O. Pippel
Atty.

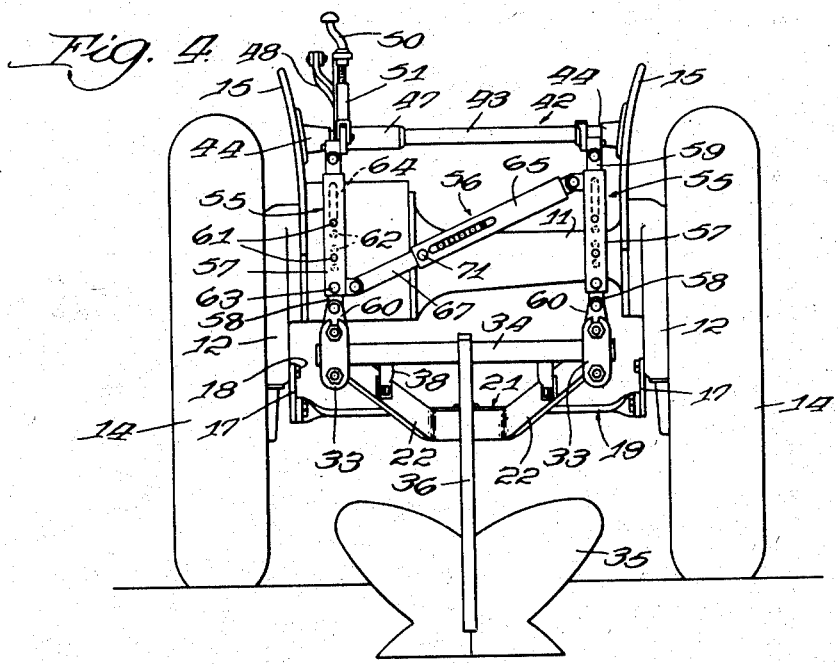
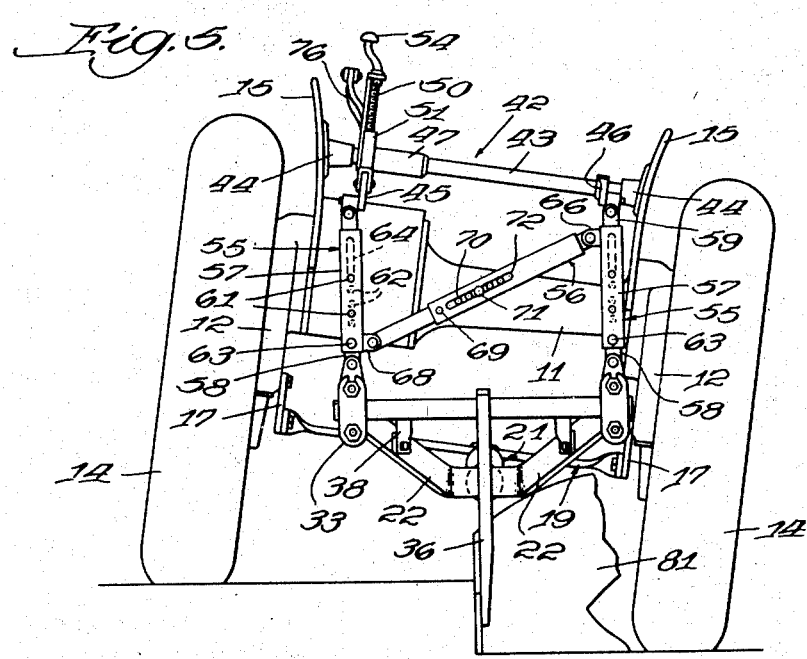

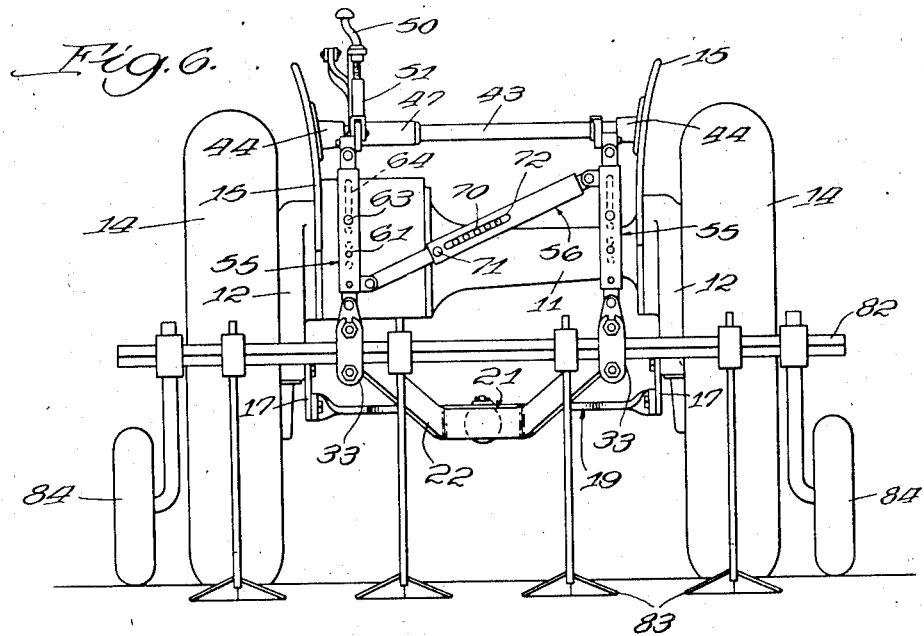

Patented May 13, 1947

2,420,530

UNITED STATES PATENT OFFICE 2,420,530

COMBINED IMPLEMENT STABILIZING AND LIFTING STRUCTURE

Arthur G. Evans, Canton, Ill., assignor to International Harvester Company, a corporation of New Jersey Application December 13, 1943, Serial No. 514,008

13 Claims. (Cl. 97—47)

This invention relates to agricultural implements and particularly to tractor-mounted implements adapted to be raised from the ground for transport purposes or the like. More specifically, the invention concerns a novel frame for the attachment of implements to a tractor, wherein a combined stabilizing and lifting structure is provided for the quick attachment of a variety of implements.

An object of the invention is to provide novel means for hitching an implement to a tractor.

Another object is to provide a universal frame structure for the quick attachment of a variety of implements to a tractor or other support.

A further object is to provide lifting linkage for raising and lowering an implement, including means for holding the implement rigid with respect to the tractor and for optionally permitting lateral swinging or vertical floating movement with respect to the tractor.

With these and other objects in view, the invention contemplates the provision of combined lifing and stabilizing linkage for raising and lowering the implement with respect to the tractor and incorporating telescoping elements selectively adjustable to vary the length thereof and to render the linkage rigid. By this mechanism applicant is able to quickly attach to his tractor a variety of working tools having different operating characteristics. For example, it is generally considered desirable that a tractor-mounted tool of the middle buster type be held against vertical or lateral movement with respect to the tractor while in working position to obtain best results. Likewise, for optimum results, a moldboard plow, which is subjected to lateral thrust against the landside of the plow bottom, should be held rigid against vertical movement other than the flexibility required to avoid damage to the tool, but should be allowed lateral swinging movement with respect to the tractor in order to follow properly in the path thereof. Again, in a cultivator of the type utilizing sweeps for severing stalks below the surface of the ground and gauge wheels for stabilizing, it is essential that the implement be held against lateral swinging movement which would permit the sweeps to by-pass resistant stalks, but that it be permitted to float free vertically in order to follow closely the contour of the ground. On the other hand, best results are obtained with a spring-tooth harrow employing gauge wheels if the implement is allowed free lateral swinging and vertical floating movement. Previously, in mounting implements having these varying characteristics upon a tractor or other support, it was necessary to provide special attaching mechanism for connecting each tool to the tractor. This, of course, was not only expensive from the standpoint of equipment cost but also required considerable time for attaching and detaching tools.

These and other objects will become clear from the following detailed description when read in conjunction with the accompanying drawings, wherein:

Figure 4 is a rear elevation of the tractor, having attached thereto the frame structure embodying the features of the present invention and having a ground-working tool of the middle buster type mounted thereupon;

Figure 5 is a rear elevation of the frame structure shown in Figures 1 to 4, having mounted thereupon a moldboard plow;

Figure 6 is a view similar to Figures 4 and 5, showing the attachment of a sweep type of cultivator; and Figure 7 is a view similar to Figure 6, showing the attachment of a spring-tooth harrow.

Figure 1:
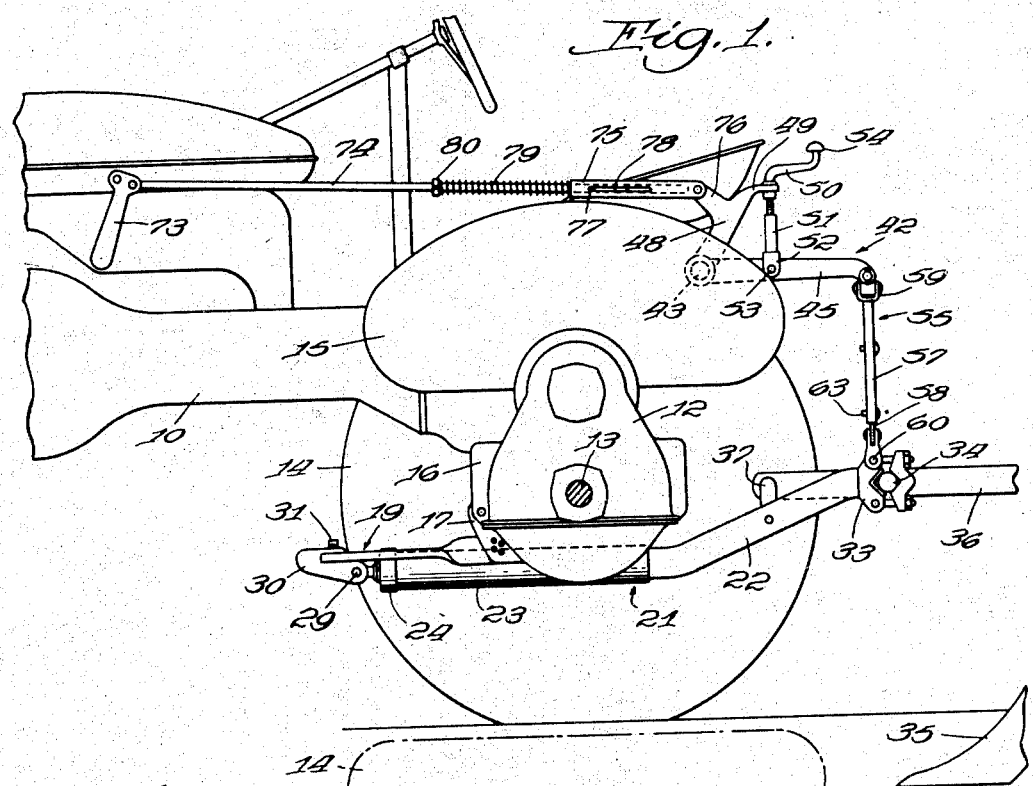
Figure 1 is a view in side elevation of the rear portion of a tractor with one wheel removed and having connected thereto a frame structure embodying the features of the present invention.
Figure 2:
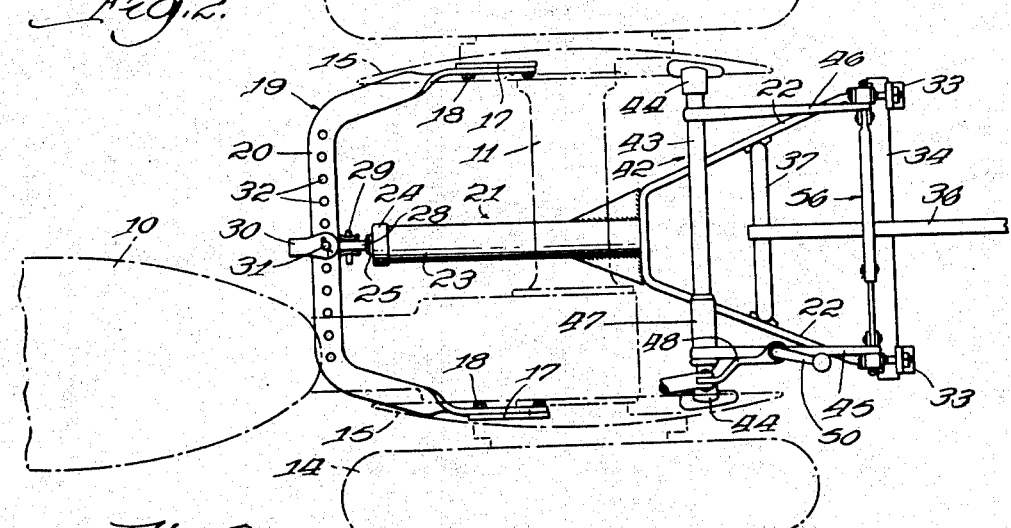
Figure 2 is a plan view of the structure shown in Figure 1.
Figure 3:
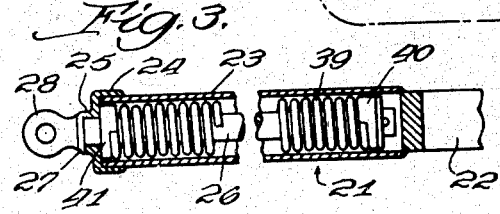
Figure 3 is a cross-sectional detail of a portion of the hitch structure.

Referring to the drawings, the numeral 10 designates the forwardly extending, laterally offset body portion 10 of a tractor having a rear axle structure 11, depending stub axle housings 12, and stub axles 13 journaling drive wheels 14. Affixed to rear axle structure 11 on opposite sides of the body thereof are fenders 15, which also serve as supports for the implement lifting structure in a manner to be hereinafter set forth. Each stub axle housing 12 is provided with attaching portions 16 having attached thereto a plate 17, to which is secured by bolts 18 the laterally spaced arms of a U-shaped draw-bar 19 having a transverse portion 20. Extending rearwardly from draw-bar 19 is a Y-shaped hitch member 21, comprising rearwardly diverging arms 22 and a tubular stem 23 provided with a cap 24 having a restricted neck portion 25 and centrally bored to receive for sliding movement a rod 26 extending into the tubular stem 23. Rod 26 has a shoulder portion 27 adapted to abut the neck portion 25 and an enlarged head 28. Head 28 is apertured to receive a pin 29 attached to a clevis 30 connected to draw-bar 19 by a pin 31 insertable in any one of a plurality of orifices 32 in the draw-bar. The rearwardly extending ends of arms 22 of hitch member 21 are provided with quick attachable clamps 33 by which a laterally extending tool-bar 34, such as shown in Figures 1 and 2, may be attached to hitch member 21. When a working tool of the middle buster type, such as is indicated at 35 in Figure 1 and more fully shown in Figure 4, is to be utilized, the tool is supported upon a beam 36 having a longitudinally extending portion attached to the bar 34 and at its forward end to a brace 37 having laterally spaced legs 38 bolted to hitch arms 22. Longitudinal flexibility is imparted to the working tool by a spring 39 surrounding the portion of rod 26 within stem 23 and abutting against a collar 40 keyed to one end of the rod and against a loose collar 41 adjacent the cap 24.

The implement is stabilized and moved vertically to and from ground-working position by means of a lifting structure 42 including a transverse rock-shaft 43, opposite ends of which are rotatably mounted in laterally spaced bearings 44 affixed to and extending inwardly from fenders 15. Extending rearwardly from the rock-shaft 43 are laterally spaced rock arms 45 and 46, arm 46 being secured to the shaft as by welding, and arm 45 being secured to a sleeve 47 loose upon the shaft. Arm 45 is adjustably held against circumferential displacement with respect to shaft 43 by a mechanism including a bracket 48 fast on shaft 43 and having a rearwardly extending arm 49 apertured to receive a crank 50 threaded for reception in a sleeve 51 provided with a yoke 52 pivoted upon a bolt 53 seated in the arm 45. Circumferential displacement of arm 45 with respect to shaft 43 and arm 46 is effected by manipulating crank handle 54 for a purpose to be hereinafter explained.

Connection between rock arms 45 and 46 and the working tool is made by a lifting link structure including laterally spaced links 55 and a diagonally extending bracing link 56 (see Figures 4-7). It will be noted that links 55 are substantial duplicates, and that a description of one will suffice for both. Each link 55 comprises a sleeve 57 and a telescoping shaft 58 freely slidable in the sleeve. The upper end of each link 55 is provided with a yoke 59 connected to the outer ends of respective rock arms 45 and 46 for longitudinal and lateral swinging movement. The lower end of each shaft 58 is connected through the intermediary of a pivot member 60 to the laterally spaced clamps 33 at the ends of hitch arms 22, for lateral and longitudinal swinging movement.

Sleeve 57 is provided with a plurality of spaced apertures 61 adapted to register with apertures 62 in shaft 58, and a pin 63 is provided for insertion in registering openings to hold the links against telescoping movement. However, as previously mentioned, it is desirable that some implements have free vertical floating movement within certain limits, and for this purpose shaft 58 is provided with an elongated slot 64 for the reception of pin 63.

Diagonal bracing link 56 comprises a sleeve 65 pivotally connected to a lug 66 projecting from the upper end of right-hand sleeve 57 and a telescopic shaft 67 pivoted upon a lug 68 projecting from the lower end of a left-hand sleeve 57. Sleeve 65 is provided with an opening 69 adapted to register with any of a number of openings 70 in shaft 67. A pin 71 is provided for insertion in openings 69 and one of the openings 70 to impart rigidity to the link. A slot 72 is also provided in sleeve 65 to receive the pin 71 and permit telescoping of the parts.

It should now be clear that a novel frame structure has been provided for attaching an implement to a tractor including a stabilizing and lifting link structure which is adjustable to operate in a variety of fashions when implements having different operating characteristics are to be utilized. Some of the implements having different operating characteristics to which the invention is applied are shown in Figures 4 to 7, inclusive, to which specific reference will be made hereinafter.

Vertical movement of the implement to and from ground-working position is accomplished by a power lift device, not shown, deriving power from the tractor and preferably of the double-acting fluid cylinder type permitting micrometer adjustments in the position of the working tool. Power is transmitted to the working tool through a lever 73 adapted to be rocked forwardly and rearwardly. Connected to lever 73 and extending rearwardly therefrom is a rod 74, the free end of which is slidably received in a sleeve member 75, which is pivoted upon a forwardly extending arm 76 of bracket 48. Near its rearward end rod 74 is provided with a projection 77 arranged to ride in a slot 78 in sleeve member 75 to limit sliding movement of rod 74. The working tool is flexibly urged downward by a spring 79 surrounding rod 74 and abutting against sleeve 75 and a collar 80 keyed to the rod.

Referring now particularly to Figure 4, it will be noted that the working tool is the middle buster 35. As pointed out before, it is desirable that this tool be held substantially rigid with respect to the tractor against both lateral and vertical swinging movement. Therefore, the pin 63 in links 55 is inserted in one of the openings 61 in the sleeve 57 and passed through one of the openings 62 in shaft 58 to hold the link against telescoping movement. Likewise, pin 71 in link 56 is inserted in the opening 69 in sleeve 65 and passed through a registering opening in shaft 67 to hold the parts against telescoping movement. Thus, due to the diagonal position of link 56, links 55 are held substantially against lateral swinging movement.

In Figure 5, it will be noted that the working tool 81 is a moldboard plow. As pointed out before, it is desirable that a moldboard plow be retained against vertical floating movement but that it be permitted a certain amount of lateral swinging movement. Therefore, the pin 63 of link 55 is inserted in one of the openings 61 in the sleeve 57 and passed through one of the openings 62 in shaft 58. Thus, the links 55 are held against telescoping. On the other hand, pin 71 of link 56 is inserted in the slot 72 of sleeve 65 and passed through one of the openings 70 in shaft 67. Shaft 67 thus has free telescoping movement with respect to sleeve 65 within the limits defined by the slot 72.

In this drawing it will be seen that the right-hand drive wheel 14 of the tractor rests in a previously formed furrow, and that the left-hand drive wheel 14 rests on unplowed ground so that the tractor is tilted. This, of course, requires an adjustment to level the plow bottom 81 with respect to the ground. In the illustration, this is accomplished by manipulating the crank 50 to circumferentially displace rock-arm 45 with respect to the rock-shaft 43 and rock-arm 46. The same or additional adjustments could be made by adjusting the length of left-hand lifting link 55.

Figure 6 illustrates the attachment of a cultivator of the sweep type comprising a transverse tool-bar 82 received by the clamps 33 and having mounted thereupon sweep shovels 83. The laterally extending ends of tool-bar 82 have attached thereto gauge wheels 84 by which the implement is gauged and stabilized. This tool is adapted to travel below the surface of the ground and to sever stalks. In order for the shovels to avoid by-passing stalks offering too great a resistance to the passage thereof, it is necessary that the implement be retained from swinging laterally, while at the same time having vertical floating movement in order to follow the contour of the ground. Therefore, pin 63 of links 55 is inserted in one of the openings 61 of sleeve 57 and passed through the slot 64 in shaft 58. Pin 71, on the other hand, is inserted in opening 69 of sleeve 65 and passed through one of the openings 70 in shaft 67. Thus, while the implement shown in Figure 6 is permitted free vertical floating movement within the limits defined by the slots 64, it is held against lateral swinging movement with respect to the tractor by the diagonal link 56.

In Figure 7, there is illustrated a spring tooth harrow supported by gauge wheels and attached to the tractor through the intermediary of the frame structure of the present invention. This implement comprises generally a transverse tool bar 85 held by the clamps 33, having mounted thereupon working tools 86. Opposite ends of the bar 85 are supported by gauge wheels 87. As pointed out before, it is desirable that this tool-bar be free to float vertically and to swing laterally with respect to the tractor. Therefore, pin 63 of links 55 is inserted in one of the openings 61 of sleeve 57 and passed through the slot 64 in shaft 58. Diagonal link 56 is likewise permitted to telescope by insertion of pin 71 in slot 72 and the passage thereof through one of the openings 70 in the shaft 67.

Having now described the invention, it should be understood that modifications may be made therein without departing from the spirit of the invention or the scope of the appended claims.

What is claimed is:

1. In an agricultural machine, a traveling support having a hitch point, a hitch device attached to said support at said hitch point and extending longitudinally of said machine, a pair of spaced rock-arms on said support pivotable about an axis spaced from said hitch point, spaced extensible lift members connecting each said rock-arm to said hitch device at locations removed from said hitch point, and means for varying the relative angular spacing of said rock-arms.

2. In an agricultural machine, a traveling support having a hitch point, a hitch device attached to said support at said hitch point and extending longitudinally of said machine, a pair of spaced rock-arms on said support pivotable about an axis spaced from said hitch point, spaced extensible lift members connecting each said rock-arm to said hitch device at locations removed from said hitch point, means on said machine for rocking said rock-arms, and means associated with said rocking means for varying the relative angular spacing of said rock-arms.

3. In an agricultural machine, a traveling support having a hitch point, a hitch device attached to said support at said hitch point and extending longitudinally of said machine, a pair of spaced rock-arms on said support pivotable about an axis spaced from said hitch point, spaced extensible lift members connecting each said rock-arm to said hitch device at locations removed from said hitch point, power means on said machine, means connecting said power means and said rock-arms for rocking movement thereof, and adjusting means associated with said connecting means for varying the relative angular spacing of said rock-arms.

4. In an agricultural machine, a traveling support having a hitch point, a hitch device attached to said support at said hitch point and extending longitudinally of said machine, a rock-shaft on said support extending transversely of said hitch device, a first rock-arm fast on said shaft, a second rock-arm journaled on said shaft and axially spaced from said first rock-arm, freely telescoping lift members connecting each said arm to said hitch device at locations spaced from said hitch point, means for limiting the extent of telescoping movement of said members, and means for optionally and adjustably rendering said links rigid.

5. In an agricultural machine, a traveling support having a hitch point, a hitch device attached to said support at said hitch point and extending longitudinally of said machine, a rock-shaft on said support extending transversely of said hitch device, a first rock-arm fast on said shaft, a second rock-arm journaled on said shaft and axially spaced from said first rock-arm, freely telescoping lift members connecting each said arm to said hitch device at locations spaced from said hitch point, a diagonal telescoping element connecting said members, means for limiting the extent of telescoping movement of said members and said element, and means for optionally and adjustably rendering said links rigid.

6. In an agricultural machine, a traveling support having a hitch point, a hitch device attached to said support at said hitch point and extending longitudinally of said machine, a rock-shaft on said support extending transversely of said hitch device, a first rock-arm fast on said shaft, a second rock-arm journaled on said shaft and axially spaced from said first rock-arm, freely telescoping lift members connecting each said arm to said hitch device at locations spaced from said hitch point, a diagonal telescoping element connecting said members, means for limiting the extent of telescoping movement of said members and said element, means for optionally and adjustably rendering said links rigid, and means for circumferentially displacing said second rock-arm with respect to said rock-shaft.

7. In an agricultural machine, a traveling support having a hitch point, a hitch structure attached to said support at said hitch point and extending longitudinally of the machine, a rock-shaft on said support extending transversely of said hitch structure, a first rock-arm fast on said shaft, a second rock-arm journaled on said shaft and axially spaced from said first rock-arm, single power means on said support for simultaneously rocking said rock-arms, connecting means between said power means and said second rock-arm for circumferentially displacing said second rock-arm with respect to said shaft, freely telescoping lift members connecting each said arm to said hitch structure at locations spaced from said hitch point, a diagonal telescoping element connecting said members, means for limiting the extent of telescoping movement of said members and said element, and means for optionally and adjustably rendering said links rigid.

8. In an agricultural machine, a traveling support having a hitch point, a hitch structure attached to said support at said hitch point, spaced rock-arms on said support pivotable about an axis removed from said hitch point, spaced freely telescoping members connecting each said rock-arm to said hitch structure at locations removed from said hitch point, and a freely telescoping element connecting said members, each said member and said telescoping element including means for limiting the extent of telescoping movement thereof and means for optionally and adjustably rendering said members and said element rigid.

9. In an agricultural machine, a traveling support having a hitch point, a hitch device attached to said support at said hitch point and extending longitudinally of said machine, said hitch device having a tubular portion enclosing a spring for flexible attachment to said support and rearwardly diverging legs, tool-attaching means on said legs, a rock-shaft on said support extending transversely of said hitch device, a pair of laterally spaced rock-arms on said shaft, telescoping members universally connecting each said arm to the legs of said hitch device and a diagonal telescoping link connecting said members, each said member and said link having means for limiting the extent of telescoping movement thereof and means for optionally and adjustably rendering said links rigid.

10. In an agricultural machine, a traveling support having a hitch point, an implement attached to said support at said hitch point, a rock-shaft on said support, spaced rock-arms on said shaft, vertically extending telescoping members connecting said arms and said implement, each said member comprising a sleeve portion and a shaft portion, registerable openings in said portions, a pin adapted to be received in said openings to prevent relative movement between said portions, and a slot in one said portion optionally adapted to receive said pin to permit limited telescoping movement thereof.

11. In an agricultural machine, a traveling support having a hitch point, an implement attached to said support at said hitch point, a rock-shaft on said support, spaced rock-arms on said shaft, vertically extending telescoping members connecting said arms and said implement, a diagonal telescoping element connecting said members, each said member and said element comprising a sleeve portion and a shaft portion, registerable openings in said portions, a pin adapted to be received in said openings to prevent relative movement between said portions, and a slot in one said portion optionally adapted to receive said pin to permit limited telescoping movement thereof.

12. In an agricultural machine, a traveling support having a hitch point, a hitch structure attached to said support at said hitch point for vertical movement and extending longitudinally of the machine, a working tool attached to said hitch structure at a location removed from said hitch point, lift means on the support for vertically moving said working tool including laterally spaced telescoping lift members, whereby said working tool has free vertical floating movement in response to variations in ground contour, and means for optionally and adjustably rendering said members rigid.

13. In an agricultural machine, a traveling support having a hitch point, a hitch structure attached to said support at said hitch point for vertical movement and extending longitudinally of the machine, a working tool attached to said hitch structure at a location removed from said hitch point, lift means on the support for vertically moving said working tool including laterally spaced telescoping lift members pivoted for lateral swinging movement of the working tool, a diagonal telescoping element connecting said members, and means for optionally, selectively and adjustably rendering said members and said element rigid, whereby to accommodate working tools having different operating characteristics.

ARTHUR G. EVANS.

REFERENCES CITED

The following references are of record in the file of this patent:

UNITED STATES PATENTS

| Number | Name | Date |
|---|---|---|
| 2,330,272 | Evans | Sept. 28, 1943 |
| 2,302,502 | Morkoski et al. | Nov. 17, 1942 |
| 1,291,177 | Saunderson | Jan. 14, 1919 |
| 1,831,990 | Benjamin | Nov. 17, 1931 |
| 1,831,997 | Brown | Nov. 17, 1931 |
| 2,319,670 | Ego | May 18, 1943 |

FOREIGN PATENTS

| Number | Country | Date |
|---|---|---|
| 679,027 | Germany | July 27, 1939 |